(12) United States Patent
Kakino et al.

(10) Patent No.: US 6,344,724 B1
(45) Date of Patent: Feb. 5, 2002

(54) NUMERICAL CONTROL APPARATUS FOR NC MACHINE TOOL

(75) Inventors: Yoshiaki Kakino, 256-5, Iwakura-hanazono-cho Sankyo-ku, Kyoto 606-0024; Makoto Fujishima, Yamatokoriyama; Hisashi Otsubo, Okayama; Hideo Nakagawa, Itami; Yoshinori Yamaoka, Aichi; Torao Takeshita, Tokyo, all of (JP)

(73) Assignees: Yoshiaki Kakino, Kyoto; Mori Seki Co., Ltd., Yamatokoriyama; Yasda Precision Tools K.K., Okayama; Osaka Kiko Co., Ltd., Osaka; Yamazaki Mazak Corporation, Aichi; Mitsubishi Denki Kabushiki Kaisha, Tokyo, all of (JP)

( * ) Notice: Subject to any disclaimer, the term of this patent is extended or adjusted under 35 U.S.C. 154(b) by 0 days.

(21) Appl. No.: 09/657,628

(22) Filed: Sep. 8, 2000

(30) Foreign Application Priority Data

Sep. 10, 1999 (JP) .......................................... 11-257274

(51) Int. Cl.[7] ........................ G05B 19/18; G05B 19/403
(52) U.S. Cl. ........................ 318/569; 318/570; 318/571; 364/474.21
(58) Field of Search ................................. 318/560–699; 364/474.21, 474.22, 474.26, 191, 474.27; 82/1.11, 118

(56) References Cited

U.S. PATENT DOCUMENTS 5,079,490 A * 1/1992 Kita et al. .................. 318/569
5,172,327 A * 12/1992 Miyata et al. ......... 364/474.21
5,321,346 A * 6/1994 Matsumura et al. ........ 318/571
2001/0015116 A1 * 8/2001 Kakino et al. ............... 82/1.11

FOREIGN PATENT DOCUMENTS

| EP | 1-083-025 A2 | * | 7/2000 |
| EP | 1-083-023 A2 | * | 8/2000 |
| JP | 62-246408 | | 10/1987 |
| JP | 4-123107 | * | 4/1992 |
| JP | 4-269153 | * | 9/1992 |
| JP | 05-277817 | | 10/1993 |
| JP | 9-1444 | * | 1/1997 |
| JP | 11-10483 | * | 1/1999 |
| JP | 11-010483 | | 1/1999 |
| JP | P2001-79734 A | * | 3/2001 |

* cited by examiner

*Primary Examiner*—Paul Ip
(74) *Attorney, Agent, or Firm*—Armstrong, Westerman, Hattori, McLeland & Naughton, LLP

(57) ABSTRACT

A numerical control apparatus (1 or 20) comprising pecking operation controlling means (12) which make a feed drive system (14) retracted when a cutting load detected by cutting load detecting means (7) exceeds a reference value during a drilling process, the cutting load detecting means (7) comprise a bite load detecting section (8) to detect the cutting load at a biting stage wherein a tool bites a work piece, and a stationary load detecting section (10) to detect the cutting load after the biting stage. The numerical control apparatus (1 or 20) comprises pecking judgement means (11) to judge that the feed drive system (14) should be retracted when a fluctuation load exceeds a specified reference value wherein the fluctuation load is obtained by reducing the bite load from the detected stationary load. When it is judged that the feed drive system (14) should be retracted, the pecking operation controlling means (12) make the feed drive system (14) retracted.

8 Claims, 7 Drawing Sheets

NUMERICAL CONTROL APPARATUS FOR NC MACHINE TOOL

BACKGROUND OF THE INVENTION

1. Field of the Invention

The present invention relates to a numerical control apparatus for an NC machine tool detecting a cutting load on the basis of an electric current for driving that is output to a feed drive system and/or an electric current for driving that is output to a spindle drive system, controlling an operation of the feed drive system to be retracted when the detected cutting load exceeds a specified reference value.

2. Related Art Statement

When drilling a deep hole in a work piece by making use of a drill and the like, a drilled hole is stuffed with chips as shown in FIG. 6 when chips are not finely exhausted from the hole, a cutting load rapidly increases as a result, consequently a tool is broken. Here in FIG. 6, a torque computed from the electric current for driving supplied to the spindle drive system is grasped as such cutting load.

Conventionally for removing above-mentioned problems, a retracting operation (or a pecking operation) is applied to the feed drive system before the cutting load will increase too much to break the tool, for exhausting the chips from the drilled hole through the retracting operation of the feed drive system so as to reduce the cutting load. Following three embodiments have been well known to apply the pecking operation to the feed drive system.

In a first embodiment provided with a process section for executing such pecking operation, a pecking process is sure to be executed non-selectively according to a pecking execution code commanded in a machining program. Here, the pecking process is certainly executed irrespective of the actual cutting load or even when the cutting load has not yet reached a load (an overload) which sure needs the pecking operation.

In a second embodiment also provided with the same process section for executing the pecking operation, the pecking process is started according to an automatic pecking execution code commanded in the machining program, for making the feed drive system execute the pecking operation only when the cutting load detected by a load detector installed to a tool holder has reached the overload.

In a third embodiment also provided with the same process section for executing the pecking operation, the pecking process is started according to the automatic pecking execution code commanded in the machining program, on the other hand, the cutting load is detected on the basis of the electric current for driving that is output to the feed drive system of the machine tool and/or the electric current for driving that is output to the spindle drive system, for letting the feed drive system execute the pecking operation only when the detected cutting load exceeds a specified reference value and reaches the overload.

However, in above-mentioned three embodiments, there have been following problems described below. That is to say, in the first pecking process according to the first embodiment, the pecking operation is sure to be executed once the pecking execution code is commanded in the machining program even when the actual cutting load has not yet reached the overload or in a condition not needing the pecking process, therefore, an unnecessary air-cutting time (non-cutting process time) increases, consequently making the process itself inefficient. Furthermore, unnecessary retracting operations and retracting amounts with considering safe first lead to an inefficient process as a result because the actual cutting load has not been detected.

In addition, in the second pecking process according to the second embodiment, the cutting load is detected by the load detector installed to the tool holder for executing the pecking process only when the actual cutting load has reached the overload, therefore an effective process is possible, on the other hand, the pecking process itself needs a large cost because of necessity of a special tool holder and an electric circuit.

Furthermore, since the cutting load fluctuates according to a feed rate of the feed drive system and a wear and abrasion of a tool, it is impossible to uniformly set a reference value for judging the above-mentioned overload, whereby a problem happens such that an experiential skill is necessary to set the optimal reference value. One embodiment is shown in FIG. 7, wherein the cutting load increases according to the feed rate. In FIG. 7, with the use of a coated carbide solid drill with an oil hole (MDW085MHK available from Sumitomo Denko Co., Ltd.) having a diameter of 8.5 mm, a work piece of FC250 was drilled at a cutting speed of 150 m/min for formation of holes each having a depth of 26.5 mm. In addition, in FIG. 7, a first peak indicates the cutting load at the feed rate of 0.2 mm/rev, a second peak indicates same at 0.25 mm/rev, a third peak indicates same at 0.3 mm/rev, a fourth peak indicates same at 0.35 mm/rev, and a fifth peak indicates same at 0.4 mm/rev respectively.

As has been described above, the above-mentioned reference value has to be respectively set according to each feed rate of the feed drive system. Furthermore, the setting of the reference value is so complicated with considering the wear and abrasion of the tool. This can be the same in the third pecking process according to the third embodiment wherein the reference value cannot be set uniformly, either.

SUMMARY OF THE INVENTION

For solving the above noted problems in the pecking process, the present invention has its principal object the provision of a numerical control apparatus which can judge the overload with using a specified reference value without any affection of the wear and abrasion of the tool even in machining wherein the feed rate changes every moment, and can also securely execute the pecking process.

In the present invention, a numerical control apparatus for an NC machine tool comprising a command generating and distributing section to generate an operation command signal according to a machining program, a feed drive controlling section to control an operation of a feed drive system on the basis of the obtained operation command signal, a spindle drive controlling section to control a rotational operation of a spindle drive system according to the machining program, cutting load detecting means to detect a cutting load on the basis of an electric current f or driving that is output to the feed drive system from the feed drive controlling section and/or an electric current for driving that is output to the spindle drive system from the spindle drive controlling section, and pecking operation controlling means to make the feed drive system retracted if the cutting load detected by the cutting load detecting means exceeds a specified reference value during a drilling process, wherein the cutting load detecting means comprise a bite load (a load on cut starting) detecting section to detect the cutting load at an early stage being in a stationary condition after a tool has contacted with a work piece, and a stationary load detecting section to detect the cutting load after the early stage, the numerical control apparatus for an NC machine tool further comprises pecking judgement means to compute a fluctuation load by reducing the cutting load detected by the bite load detecting section from the cutting load detected by the stationary load detecting section for judging that the feed drive system should be retracted when the computed fluctuation load exceeds a specified reference value, wherein the pecking operation controlling means make the feed drive system retracted on the basis of judgement of the pecking judgement means.

In the present invention, the cutting load at the early stage is detected by the bite load detecting section, on the other hand, the cutting load after such early stage is detected by the stationary load detecting section. In addition, in the pecking judgement section, the fluctuation load is computed by reducing the cutting load detected by the bite load detecting section from the cutting load detected by the stationary load detecting section. When the computed fluctuation load exceeds the specified reference value, or when an overload caused by a stuffing of chips is detected, it is judged that the retracting operation should be provided to the feed drive system, as a result the pecking operation controlling means make the feed drive system retracted.

Thus, in the present invention, the overload is judged upon the fluctuation load which is computed by reducing the cutting load at the early stage from the cutting load in the stationary condition, whereby fluctuation elements depending on a feed rate of the feed drive system as well as on a wear and abrasion of the tool can be removed so as to judge the overload according to the load data depending only upon the stuffing of the chips, consequently the overload is judged upon the specified reference value. This is because the cutting load at the early stage can be recognized almost the same as the cutting load after the early stage or the stationary load, even when the feed rate of the feed drive system changes for each process hole wherein any fluctuation element depending on the stuffing of the chips never exists. In addition, the cutting load at the early stage is recognized almost the same as the stationary load after such early stage, even when the cutting load increases as the wear and abrasion of the tool progresses.

Thus, according to the present invention, an operation which needs skills and has some troublesome represented by a setting of a reference value for each feed rate of the feed drive system as in the conventional pecking process is never requested, whereby the overload can be easily judged.

Further in the present invention, the pecking judgement means sets a reference value for judgement on the basis of the cutting load detected by the bite load detecting section, judging that the feed drive system should be retracted when the cutting load detected by the stationary load detecting section exceeds such reference value for judgement.

According to the present invention, in the pecking judgement means, the reference value for judgement is computed by multiplying the cutting load data detected by the bite load detecting section by a specified coefficient or adding a specified coefficient to the detected cutting load, thereafter it is judged that the feed drive system should be retracted when the cutting load detected by the stationary load detecting section exceeds the reference value for judgement. Thus, by judging whether the retracting operation is necessary to the feed drive system or not on the basis of the cutting load at the early stage, the fluctuation elements depending on the feed rate of the feed drive system as well as upon the wear and abrasion of the tool can be removed, as a result the overload is judged according to the load data depending only upon the stuffing of the chips, consequently functions and effects same as in the invention according to claim 1 can be expected.

Further, in the invention, the bite load detecting section detects that the tool has contacted with the work piece when the cutting load exceeds a specified reference value, recognizing the cutting load after a rate-of-change of the cutting load detected after such contact of the tool and the work piece becomes less than a specified value as the same cutting load at the early stage.

When the tool contacts with the work piece, the cutting load increases. Therefore, it can be detected that the tool has contacted with the work piece when the cutting load exceeds the specified reference value. Furthermore, since a drill edge is shaped into a cone with a specified angle, the cutting load gradually increases after the tool has contacted with the work piece, being in the stationary condition after the whole of the drill edge has contacted with the workpiece. Hence, it can be detected that the whole of the drill edge has contacted with the work piece by monitoring the rate-of-change of the cutting load after the contact and recognizing that such rate-of-change has become less than the specified value.

In addition, in the invention, the numerical control apparatus comprises tool shape data memory means to memorize a shape data of the tool, wherein the bite load detecting section estimates a time taken for the cutting load to be in the stationary condition after the contact of the tool and the work piece on the basis of the shape data memorized in the tool shape data memory means also upon the feed rate of the feed drive system, recognizing the cutting load after the estimated time has elapsed as the same cutting load at the early stage.

As has been described above, the drill edge is shaped into the cone with the specified angle, therefore if the shape and the feed rate of the tool can be recognized, the time taken for the whole of the drill edge to contact with the work piece after the tool has contacted therewith can be also estimated. According to the present invention, the cutting load after the estimated time has elapsed is detected as the cutting load at the early stage.

In addition, the invention comprises abnormality detecting means for a tool judging that the tool is in the abnormal condition when the cutting load exceeds an abnormality detection reference value by comparing such cutting load detected by the stationary load detecting section and/or the bite load detecting section with the abnormality detection reference value. Since the cutting load before the stuffing of the chips will happen increases as the wear and abrasion of the tool progresses, it is possible to judge whether the wear and abrasion of the tool has reached a limit thereof through comparison between the cutting load and the abnormality detection reference value, as a result an alarm warns an operator of the detected abnormality of the tool.

Thus, the limit of the wear and abrasion of the tool can be detected on the basis of the cutting load detected by the stationary load detecting section and/or the bite load detecting section, however, the cutting load increases also by the stuffing of the chips when the abnormality of the tool is judged upon the cutting load detected by above-mentioned stationary load detecting section, whereby it cannot be securely judged whether the increase in the cutting load depends on the wear and abrasion of the tool or on the stuffing of the chips. Therefore as in the invention according to claim 6, a time taken for judgement by the pecking judgement means is set shorter than that by the abnormality detecting means for a tool. Thus, the pecking operation is judged to be necessary to the feed drive section by the pecking judgement means before the abnormality judgement means for a tool will detect the limit of the wear and abrasion of the tool, as a result the pecking operation is executed, consequently an erroneous judgement of the limit of the wear and abrasion can be prevented because the cutting load detected by the stationary load detecting section decreases less than the abnormality detection reference value when the wear and abrasion of the tool hasn't reached the limit thereof. On the other hand, since the cutting load at the early stage exceeds the abnormality detection reference value when the wear and abrasion of the tool has reached the limit thereof, the cutting load in the stationary condition consecutively detected by the stationary load detecting section also exceeds the abnormality detection reference value, causing that the stationary load never becomes lower than the abnormality detection reference value even in the execution of the pecking operation, whereby the limit of the wear and abrasion can be detected by the abnormality detecting means for a tool before the stuffing of the chips will actually happen. Thus, the wear and abrasion of the tool can be securely detected without any affection of the pecking operation.

DETAILED DESCRIPTION OF THE PREFERRED EMBODIMENTS

Figure 1:
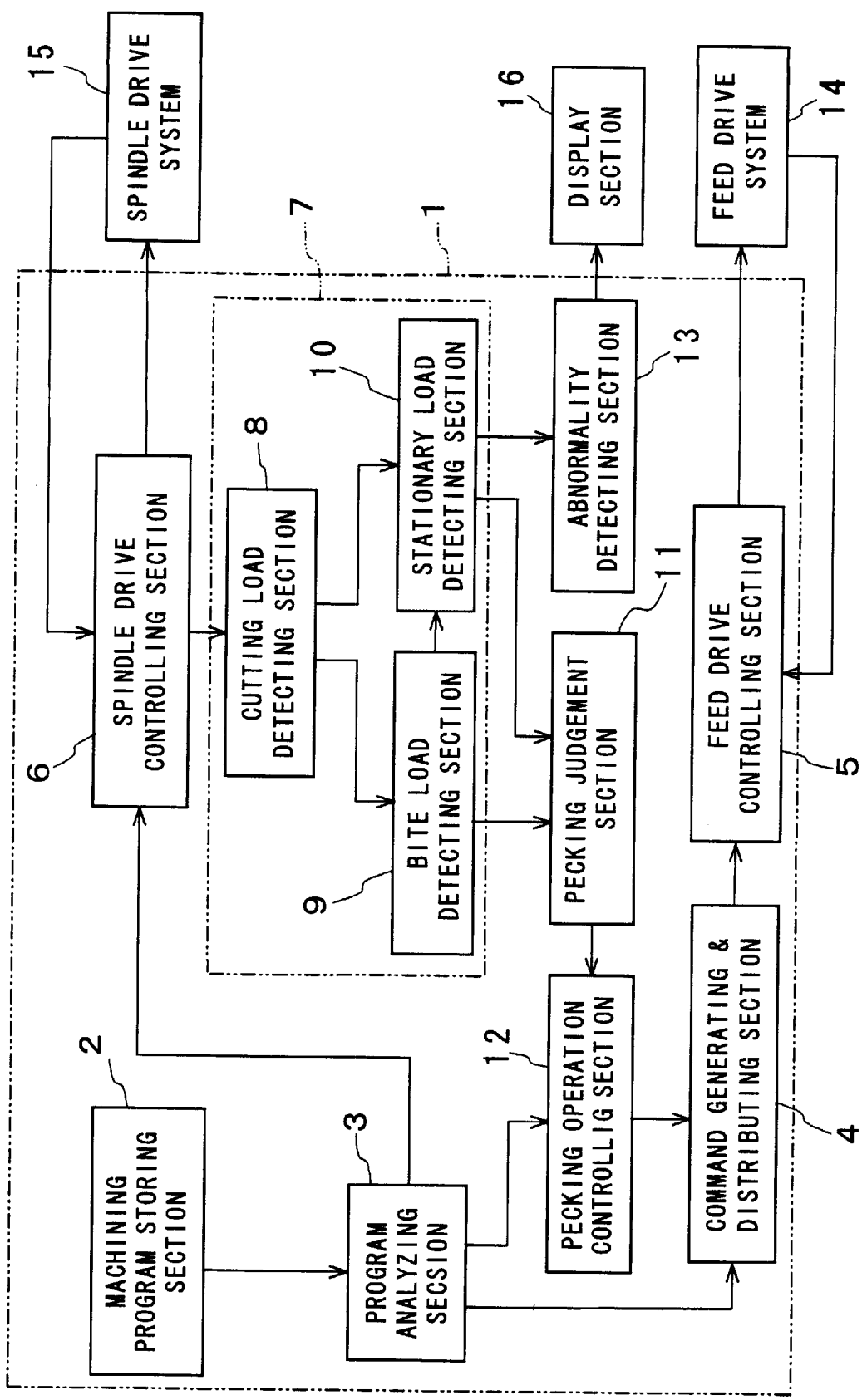
FIG. 1 is a block diagram showing an outline of a numerical control apparatus according to one embodiment of the present invention.

Embodiments of the present invention will be described below with reference to the accompanying drawings. FIG. 1 is a schematic block diagram showing the arrangement of a numerical control apparatus according to one embodiment of the present invention. This embodiment shows the numerical control apparatus which enables an automatic pecking operation during a drilling process.

As shown in FIG. 1, a numerical control apparatus 1 in this embodiment mainly comprises a machining program storing section 2, a program analyzing section 3, a command generating and distributing section 4, a feed drive controlling section 5, a spindle drive controlling section 6, cutting load detecting means 7, a pecking judgement section 11, and a pecking operation controlling section 12 and the like. Here, the cutting load detecting means 7 comprise a cutting load detecting section 8, a bite load detecting section 9, and a stationary load detecting section 10. Each section will be described below in detail. In FIG. 1, reference 14 is a feed drive system of a machine tool, reference 15 is a spindle drive system, and reference 16 is display means such as a CRT.

The machining program storing section 2 is a functioning section to store a preliminarily created machining program. The program analyzing section 3 analyzes the machining program stored in the machining program storing section 2, extracting commands concerning a rotation of the spindle drive system 15 as well as a feed rate, a feed position, and a pecking operation or the like of the feed drive system 14 in such machining program, transmitting a command signal concerning the rotation of the spindle drive system 15 to the spindle drive controlling section 6, while command signals indicative of the feed rate and the feed position of the feed drive system 14 to the command generating and distributing section 4, transmitting a command signal indicative of the pecking operation to the pecking operation controlling section 12.

The spindle drive controlling section 6 outputs an electric current for driving generated according to the received command signal to the spindle drive system 15 for controlling the operation thereof. On the other hand, the command generating and distributing section 4 determines target feed positions at regularly spaced time points for the operation of the feed drive system 14 on the basis of the received command signals and a predetermined time constant to generate operation command signals indicative of the respective target feed positions, and then transmits the operation command signals one after another to the feed drive controlling section 5. The feed drive controlling section 5 generates a velocity command signal by multiplying a deviation of a present position signal fed back from the feed drive system 14 from a received operation command signal by a position loop gain. Then, the feed drive controlling section 5 generates an electric current command signal by multiplying a deviation of a present velocity signal fed back from the feed drive system 14 from the generated velocity command signal by a velocity loop gain. The feed drive controlling section 5 further generates a drive command signal by multiplying a deviation of a present drive electric current signal fed back from the feed drive system 14 from the generated electric current command signal by an electric current loop gain, and then controls the operation of the feed drive system 14 by outputting an electric current for driving according to the drive command signal to the feed drive system 14. Although the single feed drive system is shown in FIG. 1, machine tools such as machining centers generally have a plurality of feed drive systems 14, and the command generating and distributing section 4 and the feed drive controlling section 5 are provided for each of the plurality of feed drive systems 14.

The cutting load detecting section 8 is a process section to compute a cutting load (a torque) from the electric current for driving that is output to the spindle drive system 15 from the spindle drive controlling section 6, or more particularly to say, to compute the cutting load by multiplying abovementioned electric current for driving by a preliminarily set constant.

The bite load detecting section 9 detects the cutting load (hereinafter referred to as a bite load) at an early stage being in a stationary condition after a tool has contacted with a work piece, transmitting the detected bite load data to the pecking judgement section 11, simultaneously noticing the stationary load detecting section 10 that the bite load has been detected. More particularly to say, the bite load detecting section 9 is a process section to detect that the tool has contacted with the work piece when the cutting load detected by the cutting load detecting section 8 exceeds a specified reference value, recognize the cutting load after a rate-of-change of the cutting load for each specified time detected after the contact of the tool and the work piece has become less than a specified value as the same bite load at the early stage. The cutting load increases when the tool contacts with the work piece, whereby it can be detected that the tool has contacted with the work piece when the cutting load exceeds the specified reference value. In addition, since a drill edge is shaped into a cone with a specified angle, the cutting load gradually increases after the tool has contacted with the work piece, being in a stationary condition after the whole of the drill edge has contacted with the work piece. Therefore, it can be detected that the whole of the drill edge has contacted with the work piece through a monitoring of the rate-of-change of the cutting load after the contact and through a detection that such rate-of-change has become lower than the specified value.

The stationary load detecting section 10 receives the signals from the bite load detecting section 9, transmitting the successively obtained cutting load data (hereinafter referred to as a stationary load) output from the cutting load detecting section 8 to the pecking judgement section 11.

Figure 2:
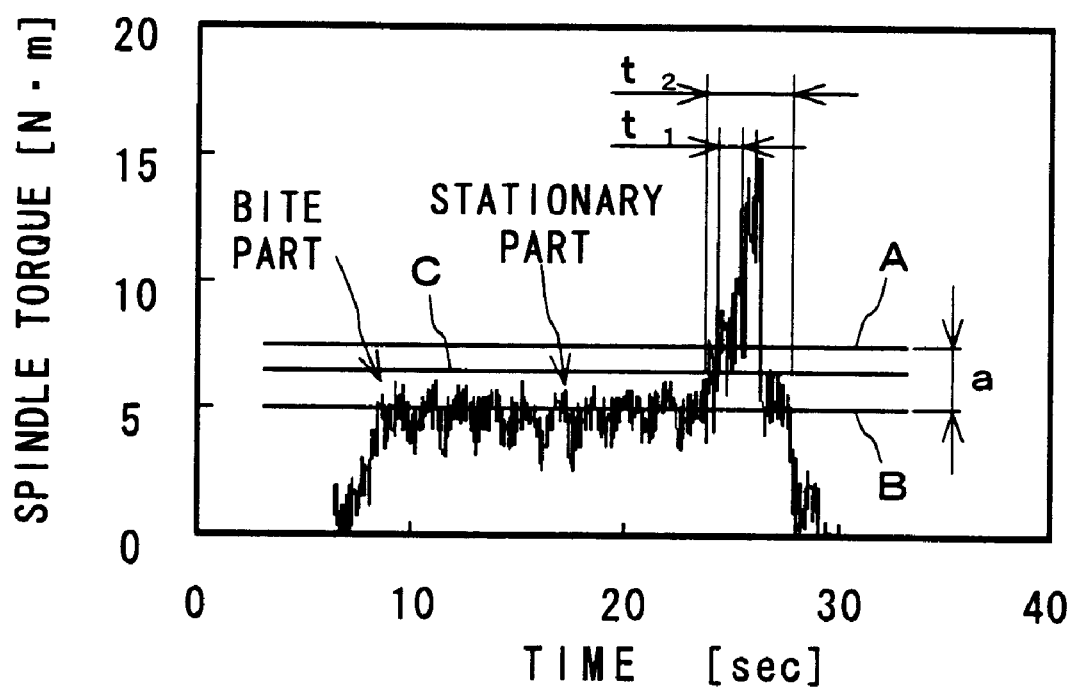
FIG. 2 is an explanation drawing showing process in the numerical control apparatus according to the embodiment.
Figure 6:
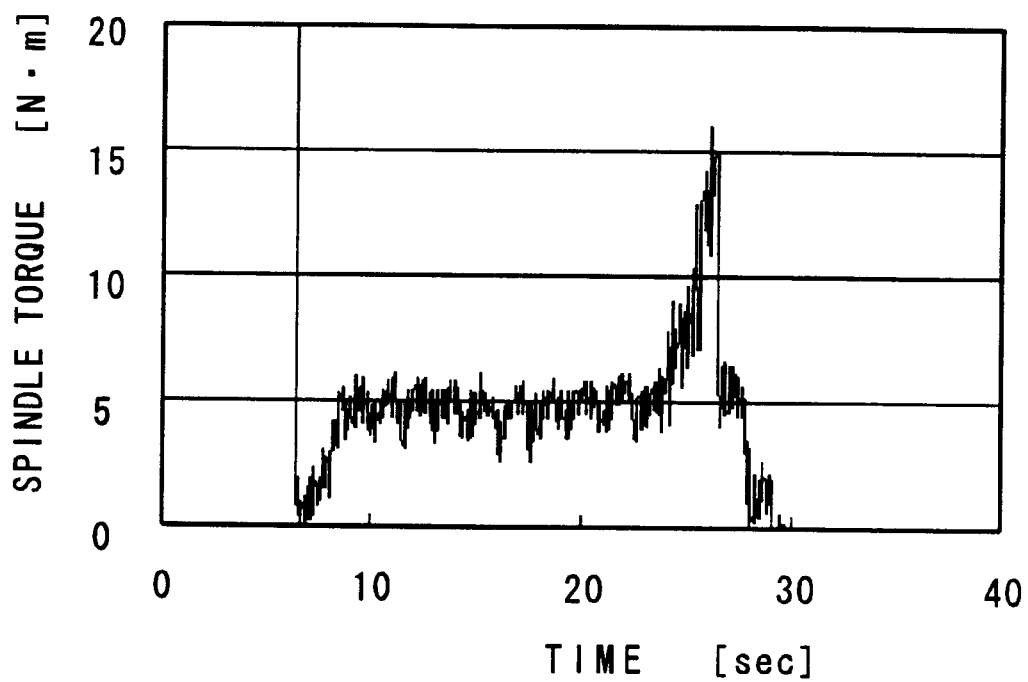
FIG. 6 is an explanation drawing showing conditions of a cutting load during a drilling process.
Figure 7:
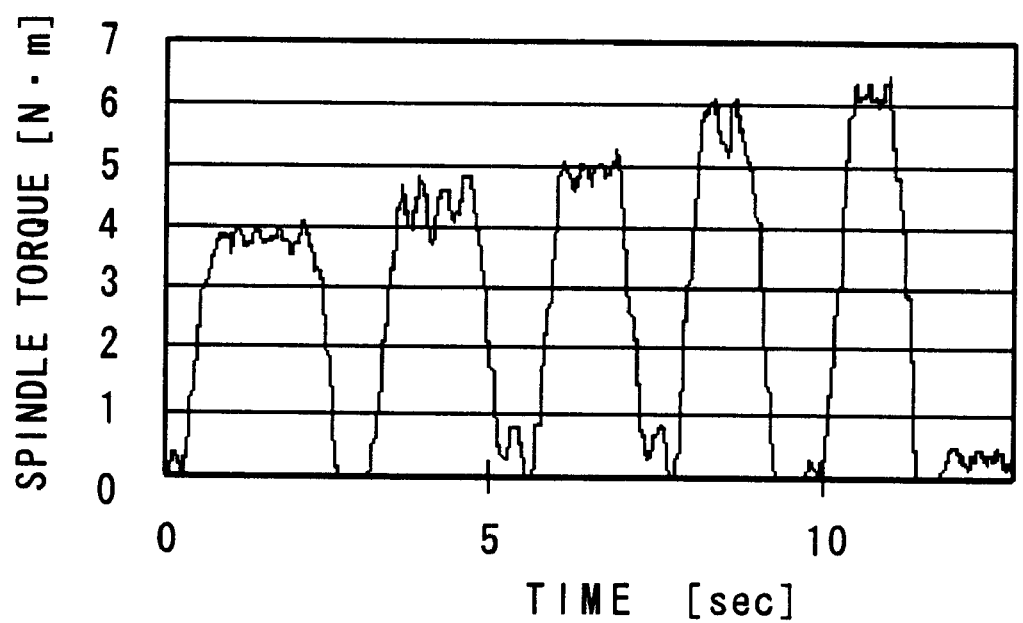
FIG. 7 is an explanation drawing showing conditions of the cutting load when a feed rate is changed during the drilling process.

The pecking judgement section 11 is a process section to receive the bite load data from the bite load detecting section 9 and the stationary load data from the stationary load detecting section 10 respectively, computing a fluctuation load by reducing the received bite load data from the stationary load data, judging that a retracting operation is necessary to the feed drive system when the computed fluctuation load exceeds a specified reference value, consequently outputting a command to execute the pecking to the pecking operation controlling section 12. The reference value is set by multiplying the bite load by a specified coefficient or using a specified constant as such reference value, wherein the specified constant can be used when the bite load is low, while the bite load can be multiplied by the specified coefficient when the bite load is high. For example, 0.5 (N) as the reference value is obtained by multiplying the bite load by 0.5 as the coefficient wherein the bite load is 1 (N), causing an insecure judgement because of a very small margin, while the reference value is set to 1 (N) as the constant when the bite load is 10 (N), also causing an insecure judgement because a ratio of the reference value to the bite load is too small. In FIG. 2, a relation of the reference value (a), the bite load (B level), and an aftermentioned abnormality detection reference value (C level) or the like is shown according to the U cutting load detected through a process like a hole drilling shown in FIG. 6. Here in FIG. 2, an A is a level obtained by adding the reference value (a) to the bite load (B level), and changes according to the bite load as an absolute value for judging whether the pecking operation is necessary or not.

The pecking operation controlling section 12 is a process section to control the pecking operation, starting a pecking process with receiving a pecking operation starting command from the program analyzing section 3, outputting an interrupt command to the command generating and distributing section 4 with receiving a pecking execution command from the pecking judgement section 11, outputting a position command to the command generating and distributing section 4 according to a stored pecking operation program, while finishing the whole of the pecking process with receiving a pecking process finishing command from the program analyzing section 3.

The abnormality detecting section 13 receives the stationary load data detected by the stationary load detecting section 10, comparing such received stationary load data with the preliminarily set abnormality detection reference value, thereafter judging that the tool is in the abnormal condition when the stationary load data exceeds the abnormality detection reference value. When it is judged that the tool is in the abnormal condition, information indicating the abnormality of the tool is transmitted to the display means 16 from the abnormality detecting section 13, displaying an alarm indicating the abnormality on the display means 16, consequently warning the operator of such abnormality.

Figure 3:
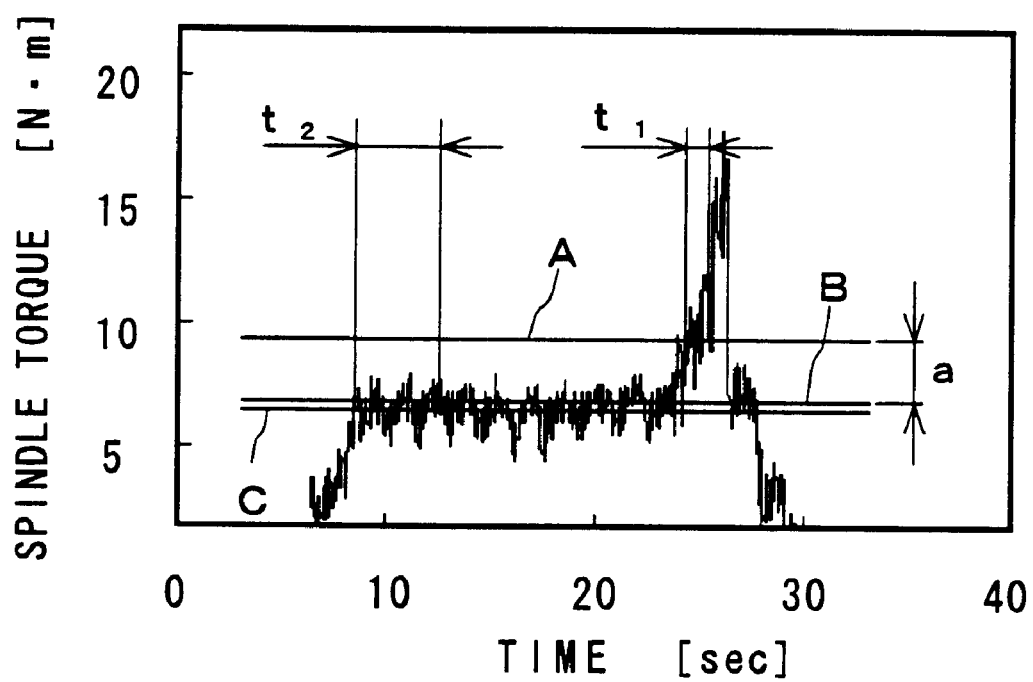
FIG. 3 is an explanation drawing showing functions in the numerical control apparatus according to the embodiment.

A time (t2) to judge the abnormality of the tool by the abnormality detecting section 13 should be set longer than a time (t1) to judge a stuffing of chips by the pecking judgement section 11. A limit of a wear and abrasion of the tool can be detected upon the cutting load detected by the stationary load detecting section 10, while it is impossible to judge whether an increase in the cutting load depends on the wear and abrasion of the tool or on the stuffing of the chips because the cutting load detected by the stationary load detecting section 10 increases also by the stuffing of the chips. Therefore, it is necessary to set the time (t1) for judgement by the pecking judgement section 11 shorter than the time (t2) for judgement by the abnormality detecting section 13. Thus, the pecking judgement section 11 judges that the pecking operation is necessary before the limit of the wear and abrasion will be detected by the abnormality detecting section 13. Thereafter, the pecking operation is actually executed, whereby the cutting load detected by the stationary load detecting section 10 becomes lower than the abnormality detection reference value when abovementioned wear and abrasion of the tool has not yet reached the limit thereof, thus an erroneous judgment of the limit of the wear and abrasion can be prevented. On the other hand, as shown in FIG. 3, the bite load (B level) detected by the bite load detecting section 9 exceeds the abnormality detection reference value (C level) when the wear and abrasion of the tool has reached the limit thereof, whereby the cutting load in the stationary condition consecutively detected by the stationary load detecting section 10 also exceeds the abnormality detection reference value, in addition, the stationary load never becomes lower than the abnormality detection reference value even in the execution of the pecking operation, therefore the abnormality detecting section 13 can detect the limit of the wear and abrasion before the stuffing of the chips will happen. Thus, the wear and abrasion of the tool can be securely detected without any affection of the pecking operation.

Figure 4:
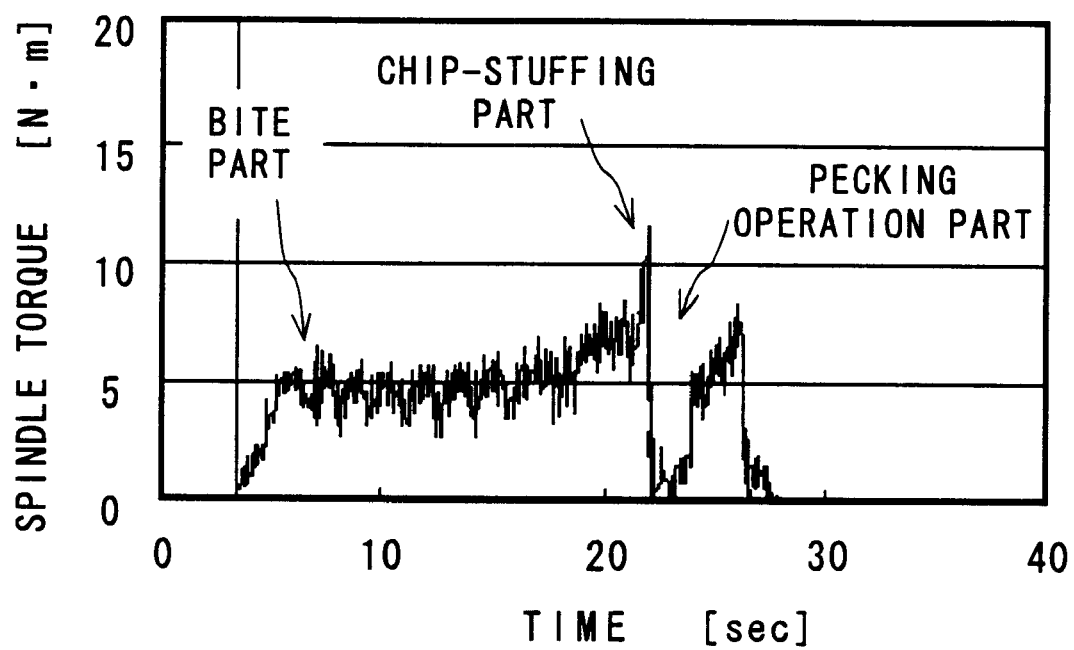
FIG. 4 is an explanation drawing showing functions in the numerical control apparatus according to the embodiment.

As has been described above, according to the numerical control apparatus 1 in the embodiment, the cutting load (the torque of the spindle) is computed by the cutting load detecting section 8 on the basis of the electric current for driving that is output to the spindle drive system 15 from the spindle drive controlling section 6. While the bite load is detected by the bite load detecting section 9, the stationary load is detected by the stationary load detecting section 10. Furthermore, the fluctuation load is computed by reducing the bite load from the stationary load by the pecking judgement section 11 which judges that the retracting operation is necessary to the feed drive system when the computed fluctuation load exceeds a specified reference value or when the fluctuation load becomes an overload, whereupon the pecking operation controlling section 12 retracts the feed drive system 14. The condition of the cutting load is shown in FIG. 4 during the pecking process.

In the abnormality detecting section 13, the stationary load detected by the stationary load detecting section 10 is compared with the specified abnormality detection reference value, while the alarm indicating the abnormality of the tool is displayed on the display means 16 when the stationary load data exceeds the abnormality detection reference value even in the pecking operation, warning the operator of such abnormality.

Thus, in the numerical control apparatus 1 in the embodiment, the fluctuation load is computed by reducing the bite load from the stationary load for judging the overload according to the computed fluctuation load, whereby fluctuation elements depending on the feed rate of the feed drive system 14 as well as on the wear and abrasion of the tool can be removed, as a result above-mentioned overload can be judged upon the load data only depending on the stuffing of the chips, consequently the overload is judged upon a specified reference value. This is because the stationary load is seen almost same as the bite load when the fluctuation element depending on the stuffing of the chips never exists even though the feed rate of the feed drive system 14 changes for each process hole, also because the stationary load is seen almost same as the bite load even though the cutting load increases as the wear and abrasion of the tool progresses.

Therefore, an operation which needs skills and has some troublesome represented by a setting of the reference value for each feed rate of the feed drive system 14 as in the conventional pecking process is unnecessary, as a result the overload can be judged easily.

Having described our invention as related to the embodiment, it is our intention that the invention be not limited by any of the details of description. For example, while in the embodiment described above the cutting load (the cutting torque) is detected on the basis of the electric current for driving that is output to the spindle drive system 15 from the spindle drive controlling section 6, alternatively the cutting load (the cutting thrust) may be detected on the basis of the electric current for driving that is output to the feed drive system 14 from the feed drive controlling section 5, furthermore, the cutting load may be evaluated from both of the cutting torque and the cutting thrust.

In addition in the embodiment described above, while the abnormality detecting section 13 is constructed such that same detects the abnormality of the tool upon the stationary load detected by the stationary load detecting section 10, alternatively the abnormality of the tool may be detected upon the bite load detected by the bite load detecting section 9 for securely detecting the abnormality of the tool with no affection of the pecking operation without considering the times taken for judgement by the pecking judgement section 11 and the abnormality detecting section 13. Here, it is also possible to detect the abnormality of the tool by making use both of the stationary load detected by the stationary load detecting section 10 and the bite load detected by the bite load detecting section 9.

The pecking judgement section 11 can be constructed such that a reference value for judgement is set on the basis of the cutting load detected by the bite load detecting section 9 to judge that the pecking operation is necessary to the feed drive system when the cutting load detected by the stationary load detecting section 10 exceeds above-mentioned reference value for judgement. Here, the reference value for judgement can be set by multiplying the bite load by the specified coefficient or adding a specified constant to the bite load, wherein the specified constant is added to the bite load when the bite load is low, on the other hand, the bite load is multiplied by the specified coefficient when the bite load is high. Thus, the fluctuation elements depending on the feed rate of the feed drive system as well as on the wear and abrasion of the tool can be removed by judging necessity of the pecking operation upon the reference value for judgement set upon the bite load, as a result the overload can be judged upon the load data depending only on the stuffing of the chips, consequently the same effect can be expected as in the numerical control apparatus 1 in the embodiment.

As has been described above, the bite load is detected upon the rate-of-change of the cutting load for each specified time detected after the tool has contacted with the work piece. Alternatively, estimating a time taken for the cutting load to be in the stationary condition after the tool has contacted with the work piece on the basis of a shape of the tool as well as upon the feed rate of the feed drive system 14, the cutting load after the estimated time has elapsed can be detected as the bite load. An outline of a numerical control apparatus of such construction is shown in FIG. 5 as another embodiment.

Figure 5:
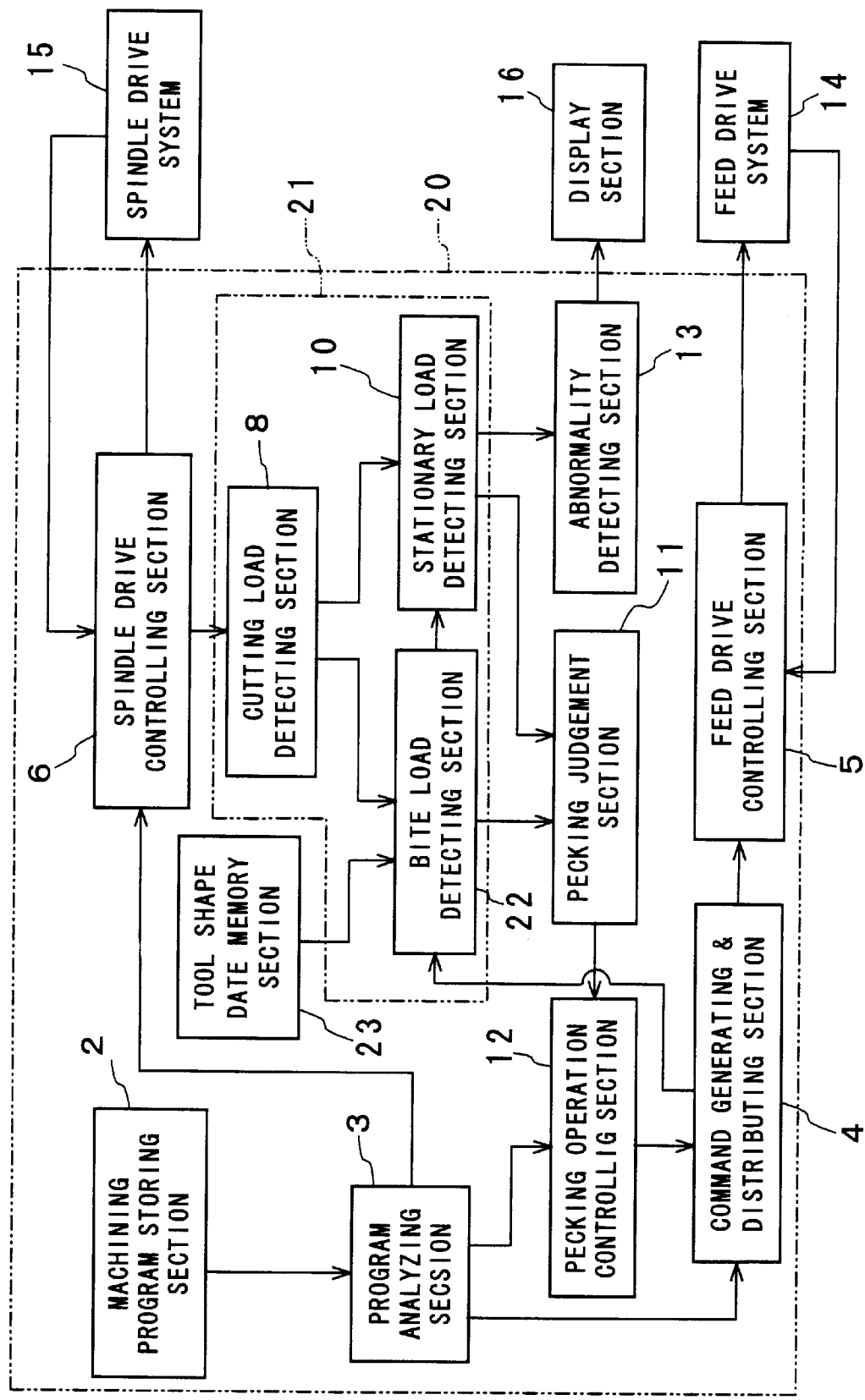
FIG. 5 is a block diagram showing an outline of the numerical control apparatus according to other embodiment of the present invention.

As shown in FIG. 5, a numerical control apparatus 20 comprises a tool shape data memory section 23 besides the means and the sections of the numerical control apparatus 1 shown in FIG. 1, also comprising a bite load detecting section 22 which performs a process different from that of the bite load detecting section 9. Here, the same means or the section is shown by the same reference. In FIG. 5, 21 is cutting load detecting means provided with the bite load detecting section 22 and the tool shape data memory section 23.

The tool shape data memory section 23 is a functioning section to memorize data in relation to dimensions of the tool. For example, data about the dimension of the diameter, the tool angle, and the tool length and the like are memorized in such tool shape data memory section 23, wherein a drill is used as the tool.

The bite load detecting section 22 estimates a time taken for the whole of the drill edge to contact with the work piece after the tool has contacted with the work piece on the basis of the shape data memorized in the tool shape data memory section 23 also upon the feed rate of the feed drive system 14 received from the command generating and distributing section 4, detecting the cutting load after the estimated time has elapsed as the bite load.

Functions and effects like the numerical control apparatus 1 can be also expected in such constructed numerical control apparatus 20.

What is claimed is:

1. A numerical control apparatus for an NC machine tool comprising:

a command generating and distributing section to generate an operation command signal according to a machining program;

a feed drive controlling section to control an operation of a feed drive system on the basis of the obtained operation command signal;

a spindle drive controlling section to control a rotational operation of a spindle drive system according to the machining program;

cutting load detecting means to detect a cutting load on the basis of an electric current for driving that is output to the feed drive system from the feed drive controlling section and/or an electric current for driving that is output to the spindle drive system from the spindle drive controlling section, comprising a bite load detecting section to detect the cutting load at an early stage being in a stationary condition after a tool has contacted with a work piece, and a stationary load detecting section to detect the cutting load after the early stage; and pecking judgement means to judge that the feed drive system should be retracted on the basis of the cutting load detected by the bite load detecting section and the cutting load detected by the stationary load detecting section during a drilling process, pecking operation controlling means to make the feed drive system retracted on the basis of judgement of the pecking judgement means.

2. A numerical control apparatus for an NC machine tool according to claim 1, wherein the pecking judgement means compute a fluctuation load by reducing the cutting load detected by the bite load detecting section from the cutting load detected by the stationary load detecting section for judging that the feed drive system should be retracted when the computed fluctuation load exceeds a specified reference value, if the cutting load detected by the cutting load detecting means exceeds a specified reference value during a drilling process.

3. A numerical control apparatus for an NC machine tool according to claim 1, wherein the pecking judgement means set a reference value for judgement on the basis of the cutting load detected by the bite load detecting section, judging that the feed drive system should be retracted when the cutting load detected by the stationary load detecting section exceeds the reference value for judgement.

4. A numerical control apparatus for an NC machine tool according to claim 1, wherein the bite load detecting section detects that the tool has contacted with the work piece when the cutting load exceeds a specified reference value.

5. A numerical control apparatus for an NC machine tool according to claim 1, wherein the bite load detecting section detects the cutting load after a rate-of-change of the cutting load detected after the tool has contacted with the work piece becomes less than a specified value as the same cutting load at the early stage.

6. A numerical control apparatus for an NC machine tool according to claim 1 comprising tool shape data memory means to memorize a shape data of the tool, wherein the bite load detecting section estimates a time taken for the cutting load to be in the stationary condition after the tool has contacted with the work piece, on the basis of the shape data of the tool memorized in the tool shape data memory means and also upon the feed rate of the feed drive system, detecting the cutting load after the estimated time has elapsed as the same cutting load at the early stage.

7. A numerical control apparatus for an NC machine tool according to claim 1 comprising abnormality detecting means for a tool judging that the tool is in an abnormal condition when the cutting load detected by the stationary load detecting section and/or the bite load detecting section exceeds a specified abnormality detection reference value through a comparison therebetween.

8. A numerical control apparatus for an NC machine tool according to claim 7 characterized in that a judging time of the pecking judgement means is set shorter than that of the abnormality detecting means for a tool.

* * * * *